United States Patent
Tsirkin (10) Patent No.: US 8,997,123 B2
(45) Date of Patent: Mar. 31, 2015

(54) RUNTIME MODIFICATION OF PROPERTY NAMES IN ADVANCED CONFIGURATION AND POWER INTERFACE (ACPI) TABLES

(75) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 283 days.

(21) Appl. No.: 13/484,074

(22) Filed: May 30, 2012

(65) Prior Publication Data

US 2013/0326542 A1   Dec. 5, 2013

(51) Int. Cl.
*G06F 3/00* (2006.01)
*G06F 9/44* (2006.01)

(52) U.S. Cl.
CPC .................. *G06F 9/4411* (2013.01)
USPC .............................. 719/327; 710/8

(58) Field of Classification Search
None
See application file for complete search history.

(56) References Cited

U.S. PATENT DOCUMENTS

| | | | |
|---|---|---|---|
| 7,363,485 B1 * | 4/2008 | Rao | 713/100 |
| 7,703,081 B1 * | 4/2010 | Buches | 717/127 |
| 2004/0243534 A1 * | 12/2004 | Culter et al. | 707/1 |
| 2006/0248282 A1 * | 11/2006 | Rostampour et al. | 711/141 |
| 2009/0144570 A1 * | 6/2009 | Chen et al. | 713/320 |
| 2011/0276794 A1 * | 11/2011 | Yamaguchi | 713/1 |
| 2012/0054868 A1 * | 3/2012 | Ramalingam | 726/24 |

* cited by examiner

*Primary Examiner* — Charles E Anya
(74) *Attorney, Agent, or Firm* — Lowenstein Sandler LLP (57) ABSTRACT

A system and method are disclosed for efficient runtime modification of device property names in Advanced Configuration and Power Interface (ACPI) tables. In accordance with one embodiment, a computer system determines whether a device supports a device property, and when the device does not support the device property, a device property name corresponding to the device name is modified in a particular entry of an ACPI table, such that a checksum for that entry remains unchanged. The modified device property name indicates to the computer system that the device does not support the device property.

24 Claims, 6 Drawing Sheets

RUNTIME MODIFICATION OF PROPERTY NAMES IN ADVANCED CONFIGURATION AND POWER INTERFACE (ACPI) TABLES

TECHNICAL FIELD

This disclosure relates to operating systems, and more particularly, to interprocess communication.

BACKGROUND

An operating system (OS) is a set of programs that manage computer hardware resources and provide common services for application software. For hardware functions such as input and output and memory allocation, the operating system typically acts as an intermediary between application programs and hardware. Operating systems may be found on a variety of devices, including desktop computers, servers, smartphones, video game consoles, and so forth.

The Advanced Configuration and Power Interface (ACPI) specification provides an open standard for device configuration and power management by the operating system. The ACPI specification defines four global "Gx" states G0 through G3, six sleep "Sx" states S0 through S5, four device states D0 through D3, four processor states C0 through C3, and up to 17 implementation-dependent power-performance states P0 through Pn, where n is an integer between 1 and 16 inclusive. In addition, ACPI defines several tables that provide an interface between an ACPI-compliant operating system and system firmware, including a Differentiated System Description Table (DSDT), a Secondary System Description Table (SSDT), and a System Resource Affinity Table (SRAT).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method for efficient runtime modification of device property names in Advanced Configuration and Power Interface (ACPI) tables. In one embodiment, a computer system determines whether a device supports a particular device property (for example, a CD-ROM drive supports the property 'ejectable', but a mouse does not), and when the device does not support the device property, a device property name corresponding to the device name is modified in a particular entry of an ACPI table, such that a checksum 3 remains unchanged. The modified device property name indicates to the computer system that the device does not support the device property.

In one embodiment, the operating system initializes an ACPI table such that the table includes entries in which a device does not support a given property, as well as entries in which a device does support the associated property. Subsequently, at runtime, the operating system (OS) inspects entries in the ACPI table, and when an entry is discovered where the device does not support the associated property, the OS updates the property name in the entry to an invalid device property name, thereby indicating to the operating system that the device does not support the property associated with the prior, valid property name.

In one embodiment, the device property name is updated in such a way that no change is necessary to the checksum for the ACPI table image including that entry. In other words, the checksum, which is computed based on the AML encoding including the device property name, yields the same value for the modified, invalid device property name as the original, valid device property name. In one embodiment, valid device property names for table entries are of the form _string, where 'string' is a character string comprising one or more alphanumeric characters, and such names are updated to the invalid property name string_ (i.e., the prefix underscore character is moved from the first position of the property name to the last position of the property name).

Embodiments of the present disclosure thus provide a convenient and efficient mechanism for managing entries in ACPI tables. This mechanism is particularly advantageous in that device properties can be enabled and disabled via a single atomic memory operation. Moreover, while the present disclosure is described with respect to ACPI tables, embodiments of the present disclosure may be employed for other types of tables, including other types of operating system tables as well as tables that are not related to operating systems.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "modifying", "executing", "initializing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
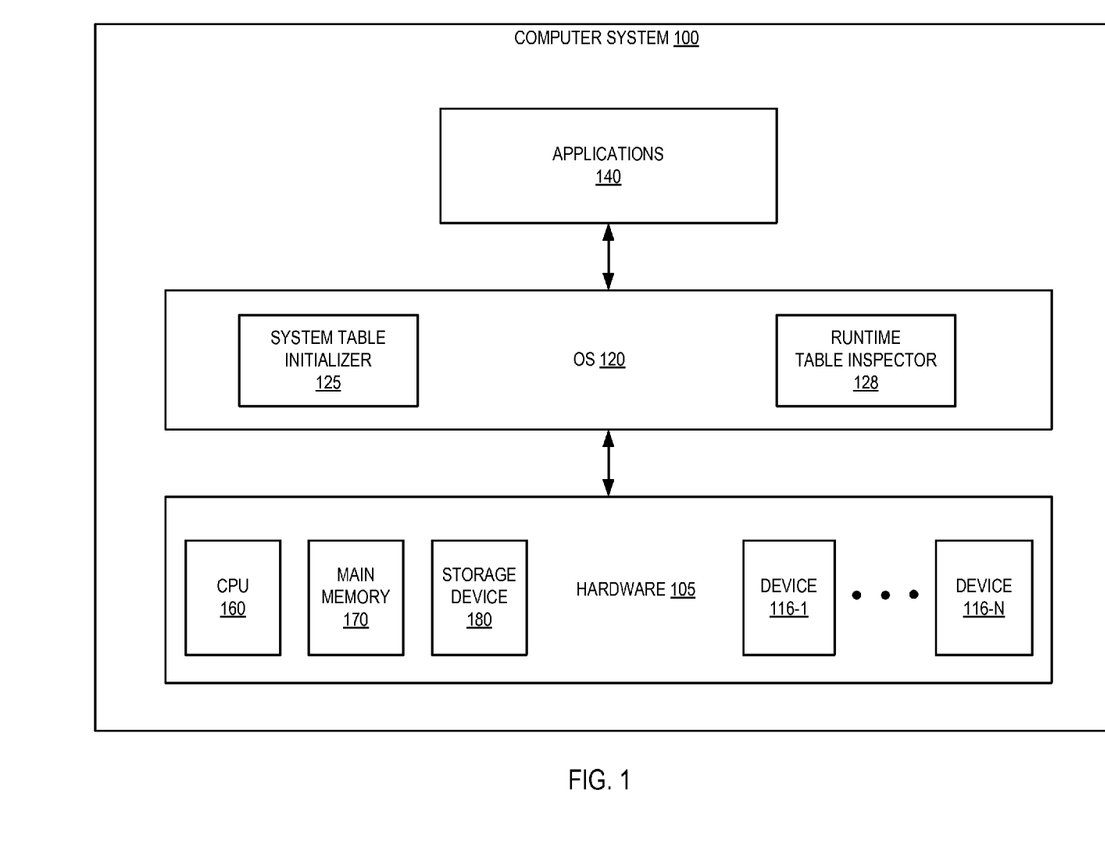
FIG. 1 depicts an exemplary computer system architecture, in accordance with an embodiment of the present invention.

FIG. 1 depicts an exemplary architecture of the salient elements of a computer system 100, in accordance with an embodiment of the present invention. The computer system 100 may be a server, a mainframe, a workstation, a personal computer (PC), a mobile phone, a palm-sized computing device, etc. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 includes an underlying hardware platform 105 that comprises a central processing unit (CPU) 160, main memory 170, storage device 180, and one or more devices 116-1 through 116-N (e.g., a printer, a CD-ROM drive, a graphics accelerator card, etc.), where N is a positive integer.

Central processing unit (CPU) 160 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Main memory 170 may include volatile memory devices (e.g., random access memory (RAM)), non-volatile memory devices (e.g., flash memory), and/or other types of memory devices. Storage device 180 may include a magnetic hard disk, a Universal Serial Bus [USB] solid state drive, a Redundant Array of Independent Disks [RAID] system, a network attached storage [NAS] array, etc.

Computer system 100 runs an operating system (OS) 120, which comprises software, firmware, or both, that manages the hardware resources of the computer system and that provides functions such as interprocess communication, scheduling, memory management, and so forth to software applications 140. In one embodiment, operating system 120 includes a system table initializer 125 and a runtime table inspector 128. System table initializer 125 comprises software, firmware, or both, that initializes the contents of one or more ACPI tables, as described in detail below with respect to FIGS. 2 and 4. Runtime table inspector 128 comprises software, firmware, or both, that processes the contents of one or more ACPI tables at runtime. More particularly, runtime table inspector 128 inspects entries in one or more ACPI tables, and when an entry is discovered where the device does not support the associated property, runtime table inspector 128 updates the property name in the entry to an invalid device property name that keeps the checksum the same, thereby indicating to OS 120 that the device does not support the property. The operation of runtime table inspector 128 is described in more detail below with respect to FIGS. 4 and 5.

Figure 2:
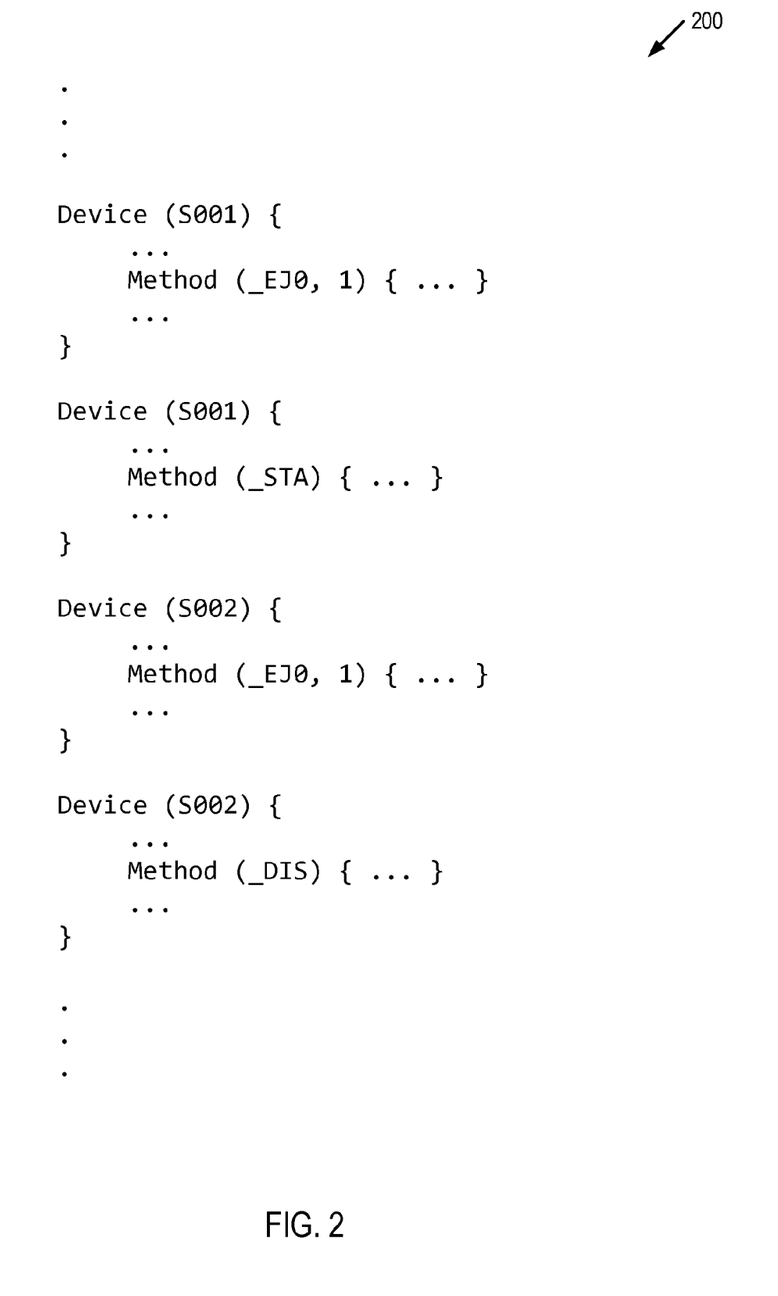
FIG. 2 depicts an illustrative code segment for defining entries in an ACPI table.

FIG. 2 depicts an illustrative code segment 200 for defining entries in an ACPI table. Illustrative code segment 200 is expressed as bytecodes in the ACPI machine language (AML); it should be noted, however, that some other embodiments might employ code in another language to define entries in an ACPI (or other type of) table. More particularly, code segment 200 defines four entries of a table, two for a device that has the name "S001" and two for a device that has the name "S002". As shown in FIG. 2, an entry is defined by declaring a device block (e.g., "Device (S001) { . . . }) that contains a method block with a method signature of one or more parameters, where one of the parameters is the name of a property (for example, property _EJ0 indicates that the associated device has an 'eject' function (e.g., ejecting a CD from a CD-ROM drive; ejecting a USB flash drive, which allows the drive to be safely disconnected; etc.). When code segment 200 is interpreted, the result is that four entries are inserted into the pertinent ACPI table, one for each of the device blocks. It should be noted that defining entries via code segments may be used by operating systems developers as a convenient way of constructing tables, and is the method employed in the ACPI standard.

Figure 3:
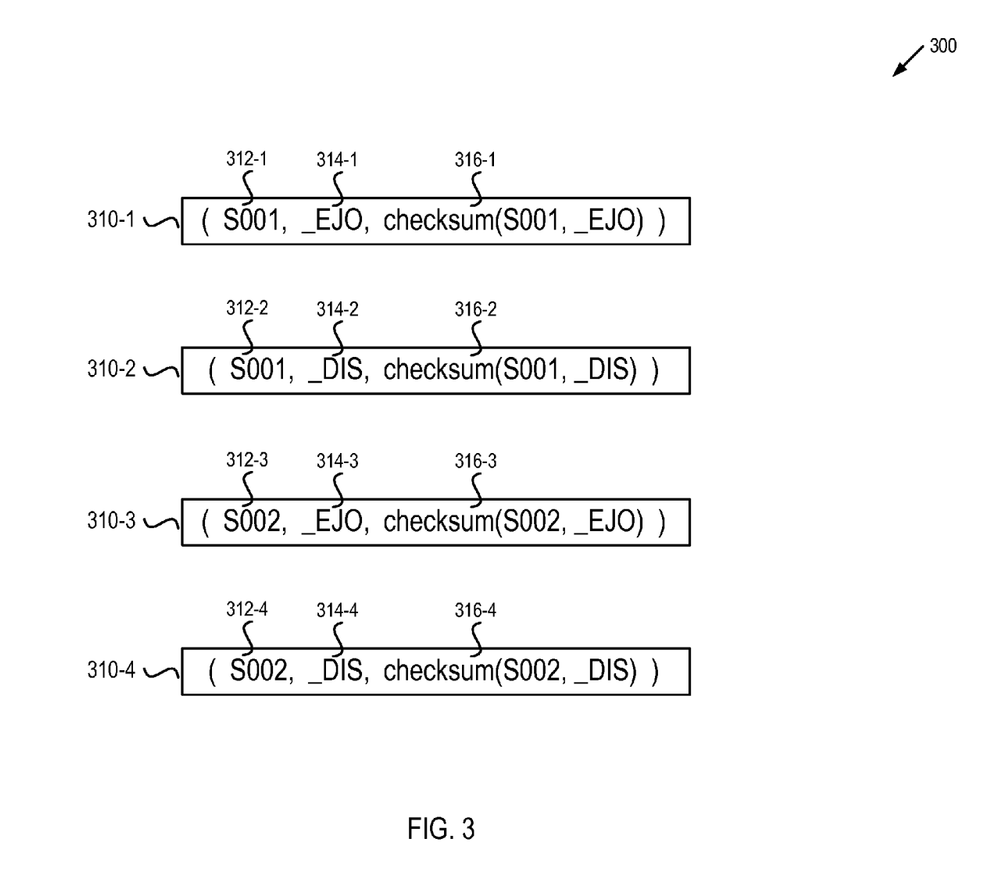
FIG. 3 depicts a conceptual representation of an ACPI table as a relation.

FIG. 3 depicts a conceptual representation 300 of an example ACPI table as a relation. A relation can represent is a set of one or more tuples, where each tuple is an ordered list of N elements, and where N is an integer greater than or equal to two. As the ACPI tables are not explicitly constructed (as is typically done in applications such as spreadsheets and some rudimentary GUI-based relational database systems), it can be convenient to think of the entries as tuples, rather than a two-dimensional array of cells.

Conceptual representation 300 depicts four tuples 310-1 through 310-4 corresponding to the four entries of code segment 200. As shown in FIG. 3, each tuple 310-i, where i is an integer between 1 and 4 inclusive, is an ordered list of three elements: a device name 312-i, a device property name 314-i, and a checksum 316-i that is based on the device name 312-i and device property name 314-i (illustrated accordingly in the figure as a function).

Figure 4:
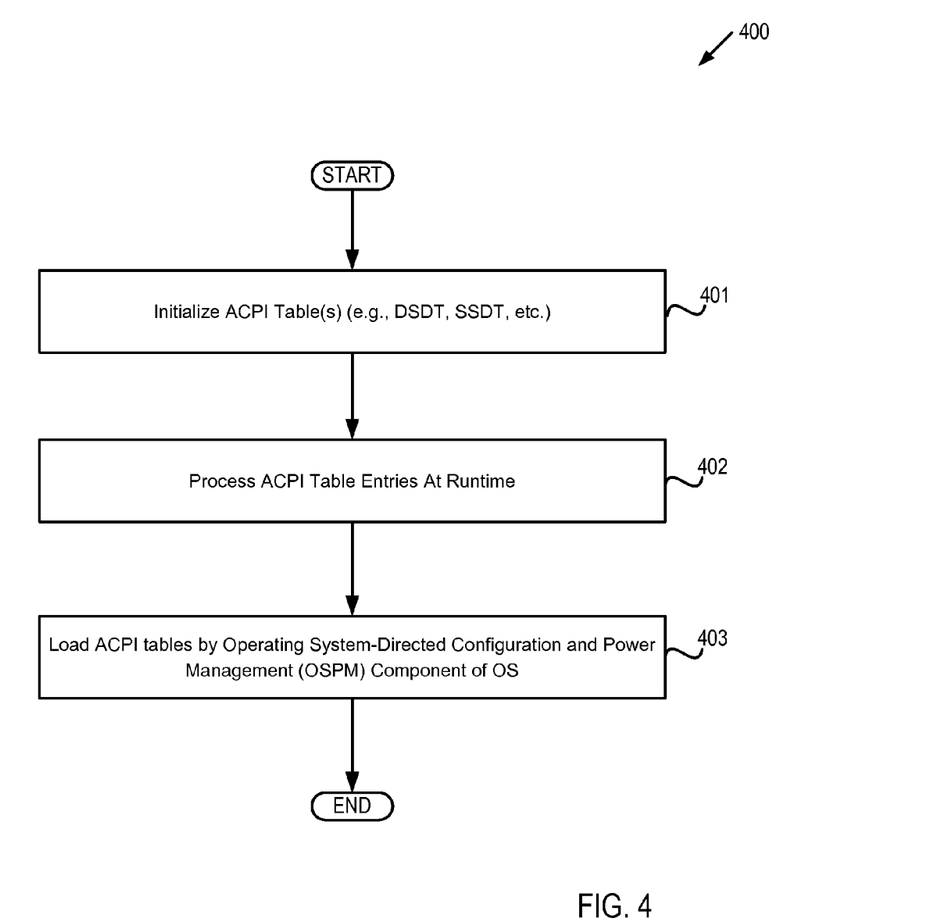
FIG. 4 depicts a flow diagram of one embodiment of a method for managing an ACPI table.

FIG. 4 depicts a flow diagram of one embodiment of a method 400 for managing an ACPI table. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine.

At block 401, one or more ACPI tables are initialized. In one embodiment, the Differentiated System Description Table (DSDT) and Secondary System Description Table (SSDT) are initialized, while in some other embodiments, one or more other ACPI tables might be initialized in addition to, or instead of, these two tables, while in yet other embodiments, one or more other system tables (or one or more tables external to OS 120, such as a relational database table or a table embedded in a configuration file) might be initialized in addition to, or instead of, the DSDT and SSDT.

The one or more ACPI tables are initialized at block 401 by interpreting a code segment of the form of illustrative code segment 200 for each table, and populating each table accordingly. In one embodiment, at least one of the code segments defines entries for each combination of device name and device property name such that the device name supports the device property (i.e., "valid entries"), and at least one combination of device name and device property name where the device name does not support the device property (i.e., an "invalid entry").

It should be noted that in some embodiments, the code segment might define a proper subset of valid entries, rather than the entire set of valid entries. Further, in some embodiments the code segment might define the entire set of invalid entries (e.g., every combination of device and property where the device does not support the property), while in some other embodiments the code segment might define a proper subset of invalid entries. It should be further noted that in embodiments where computer system 100 is a virtualized system, block 401 may be skipped, and instead a hypervisor may give a guest access to pre-initialized tables. In one embodiment, block 401 is performed by system table initializer 125.

At block 402, the ACPI table entries are processed at runtime. An embodiment of a method for performing block 402 is described in detail below with respect to FIG. 5. In one embodiment, block 402 is performed by runtime table inspector 128. At block 403, the ACPI tables are loaded by an Operating System-Directed Configuration and Power Management (OSPM) Component of operating system 120.

Figure 5:
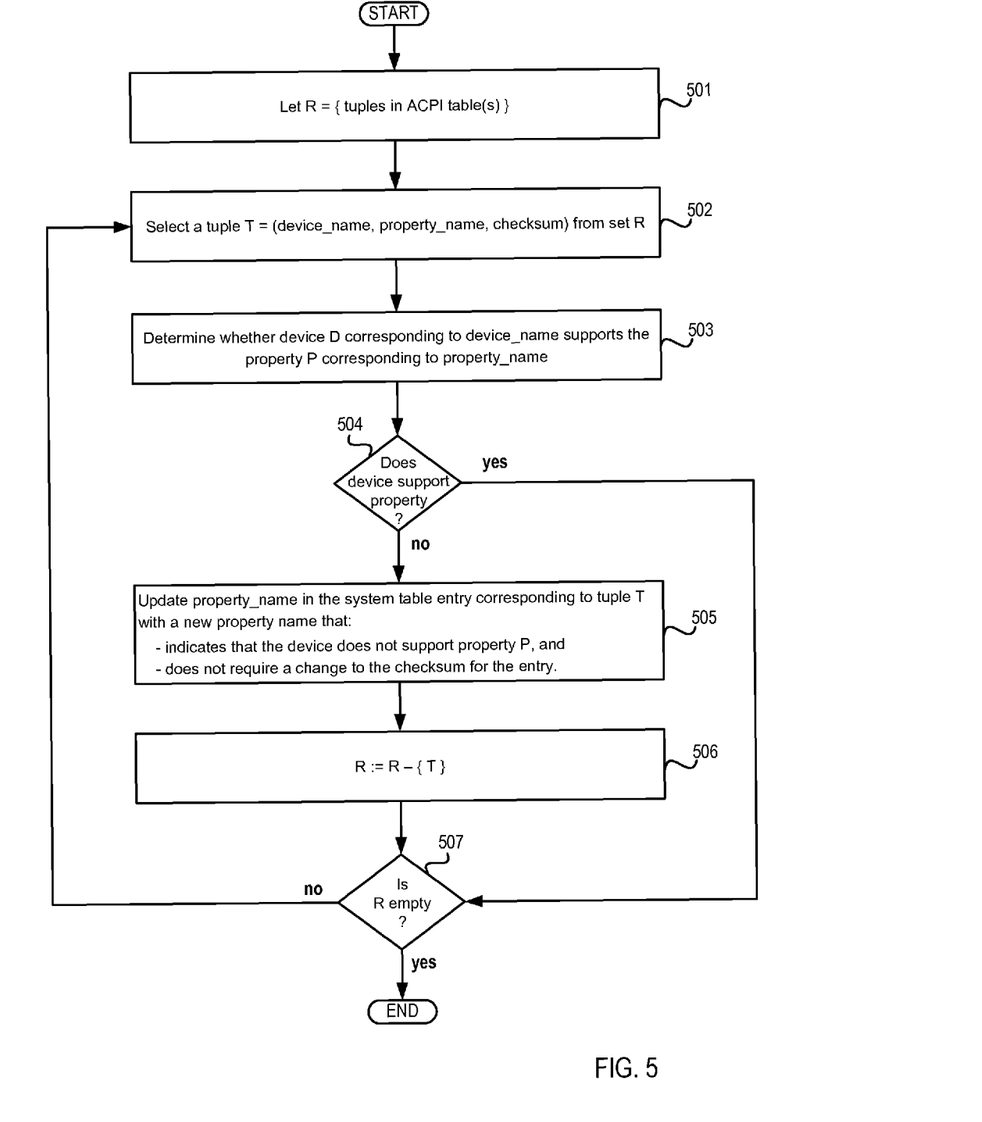
FIG. 5 depicts a flow diagram of one embodiment of a method for modifying one or more entries of an ACPI table at runtime.

FIG. 5 depicts a flow diagram of one embodiment of a method for modifying one or more entries of an ACPI table at runtime. It should be noted that the method of FIG. 5 is disclosed with respect to abstract, set-theoretic elements (e.g., relations and tuples) rather than more concrete elements such as tables and rows in order to make clear that the method is applicable to any type of physical data structure. It should also be noted that blocks depicted in FIG. 5 can be performed simultaneously or in a different order than that depicted.

At block 501, variable R is initialized to the set of tuples in the one or more ACPI tables initialized at block 401 of FIG. 4. At block 502, a tuple T=(device_name, property_name, checksum) is selected form set R. In one embodiment, the selection at block 502 may be performed arbitrarily, while in some other embodiments tuple T may be selected in some informed manner (e.g., in accordance with a priority ordering of devices, etc.)

At block 503, runtime table inspector 128 determines whether the device D corresponding to device_name supports the property P corresponding to property_name. Block 504 branches based on the determination at block 503; if the device does support the property, execution continues at block 507, otherwise execution proceeds at block 505.

At block 505, the property_name character string is updated with a new property name that indicates to OS 120 that the device does not support property P, and that does not require a change to the checksum for the entry. In one embodiment, each initial property names defined by the code segment are valid property names of the form _string (e.g., _EJ0, _STA, etc.), and the new name is the same as the original name, with the exception that the underscore character is at the end of the name, rather than the beginning of the name (e.g., EJ0_, STA_, etc.). It should be noted that the manner in which the property name is updated at block 505 may depend on the particular checksum function used, so that in some other embodiments, another method of updating the property name might be required in order to keep the checksum invariant. It should also be noted that the operation(s) employed at block 505 to effect the name update may depend on the particular implementation, so that in some embodiments the name may be replaced altogether by a write operation, while in some other embodiments the name may be modified in some way (e.g., via one or more bit-level shift or roll operations, etc.).

At block 506, tuple T is removed from set R. Block 507 branches based on whether set R is empty after the removal of tuple T; if so, the method terminates, otherwise execution continues back at block 502.

Figure 6:
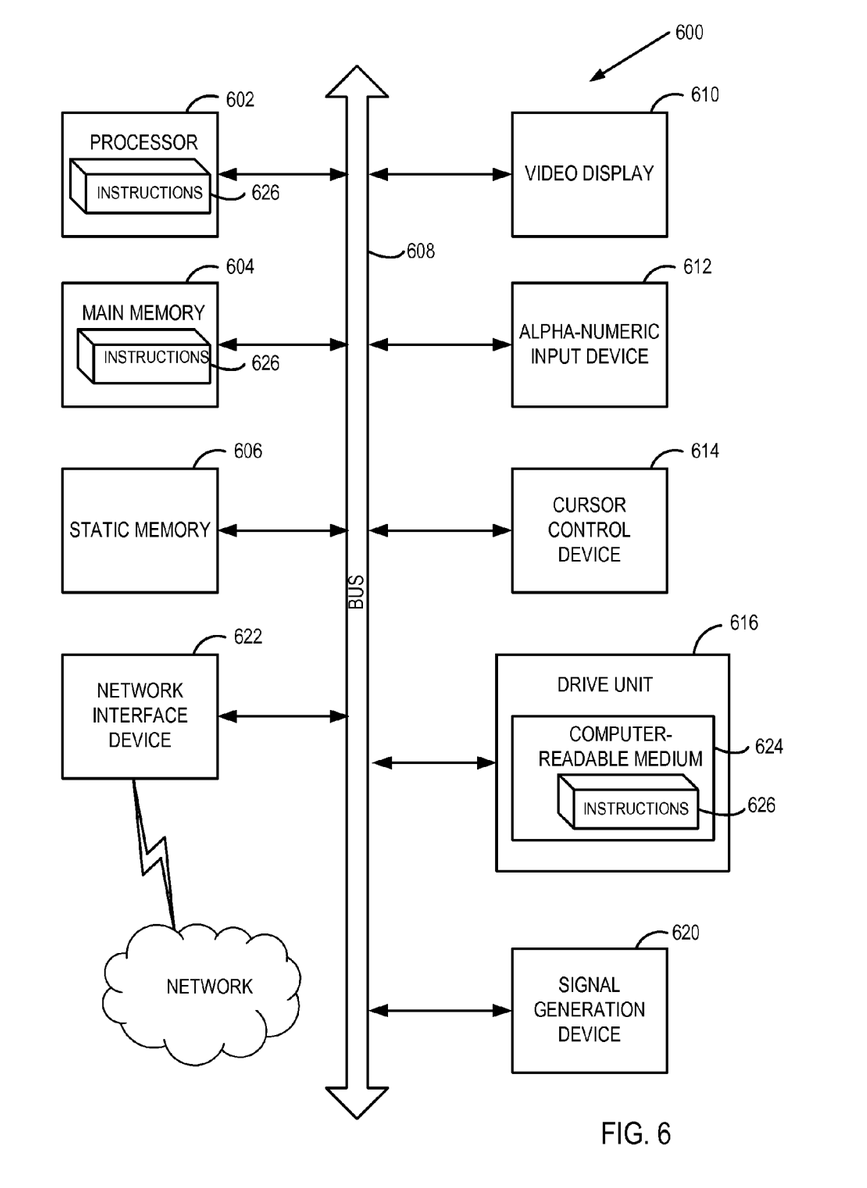
FIG. 6 depicts a block diagram of an illustrative computer system operating in accordance with embodiments of the invention.

FIG. 6 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions corresponding to the methods of FIGS. 2 through 5, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a computer system, whether a device identified in a system table supports a device property; and
   when the device does not support the device property, modifying, in an entry of the system table, a device property name corresponding to the device property;
   wherein the system table comprises a plurality of entries, each entry associating a respective device name with a respective device property name, and each entry comprising a respective checksum in view of the respective device name and the respective device property name; and
   wherein the modified device property name indicates to the computer system that the device does not support the device property; and
   wherein the modified device property name does not impact the checksum of the corresponding entry.

2. The method of claim 1 wherein the system table is initialized to comprise at least one entry that associates a device property with a device that does not support the device property, and wherein the determining is done at runtime.

3. The method of claim 1 wherein the modified device property name is not a valid device property name.

4. The method of claim 3 wherein the device property name comprises a prefix character and a suffix string comprising a character, and wherein the modified device property name is the concatenation of the suffix string followed by the prefix character.

5. The method of claim 4 wherein the prefix character is an underscore character.

6. The method of claim 1 wherein the system table is an Advanced Configuration and Power Interface (ACPI) table.

7. The method of claim 6 wherein the ACPI table is one of a Differentiated System Description Table (DSDT) and a Secondary System Description Table (SSDT).

8. The method of claim 1 wherein the modifying of the entry of the system table is performed by a single atomic memory operation.

9. An apparatus comprising:
   a memory to store a relation, wherein the relation comprises a tuple associating (i) a device name corresponding to a device, (ii) a device property name corresponding to a device property, and (iii) a checksum that is in view of the device name and the device property name; and
   a processing device to:
   execute an operating system,
   determine, for the tuple, whether the device supports the device property, and
   when the device does not support the device property, updating the device property name in the tuple to a new name that:
   indicates to the operating system that the device does not support the device property, and
   does not impact the checksum.

10. The apparatus of claim 9 wherein the relation is initialized to comprise at least one tuple that associates a device property with a device that does not support the device property, and wherein the determining is done at runtime.

11. The apparatus of claim 9 wherein the new name is not a valid device property name.

12. The apparatus of claim 11 wherein the device property name comprises a prefix character and a suffix string comprising a character, and wherein the new name is the concatenation of the suffix string followed by the prefix character.

13. The apparatus of claim 12 wherein the prefix character is an underscore character.

14. The apparatus of claim 9 wherein the relation is stored as a table.

15. The apparatus of claim 14 wherein the table is an Advanced Configuration and Power Interface (ACPI) table.

16. The apparatus of claim 15 wherein the tuple is changed by a single atomic memory operation.

17. The apparatus of claim 14 wherein each entry of the table is defined by code that specifies a method for the device, and wherein the device property name is a parameter of the method.

18. A non-transitory computer readable storage medium, having instructions stored therein, which when executed, cause a computer system to perform operations comprising:
 determining, by the computer system, whether a device identified in an Advanced Configuration and Power Interface (ACPI) table supports a device property; and
 when the device does not support the device property, updating, in an entry of the ACPI table, a device property name corresponding to the device property;
 wherein the ACPI table comprises a plurality of entries, each entry associating a respective device name with a respective device property name, and each entry comprising a respective checksum in view of the respective device name and the respective device property name; and
 wherein the modified device property name indicates to the computer system that the device does not support the device property; and
 wherein the modified device property name does not require a change to the checksum for the entry.

19. The non-transitory computer readable storage medium of claim 18 wherein the ACPI table is initialized to comprise at least one entry that associates a device property with a device that does not support the device property, and wherein the determining is done at runtime.

20. The non-transitory computer readable storage medium of claim 18 wherein the modified device property name is not a valid device property name.

21. The non-transitory computer readable storage medium of claim 20 wherein the device property name comprises a prefix character and a suffix string comprising a character, and wherein the modified device property name is the concatenation of the suffix string followed by the prefix character.

22. The non-transitory computer readable storage medium of claim 21 wherein the prefix character is an underscore character.

23. The non-transitory computer readable storage medium of claim 18 wherein the ACPI table is one of a Differentiated System Description Table (DSDT) and a Secondary System Description Table (SSDT).

24. The non-transitory computer readable storage medium of claim 18 wherein the modifying of the entry of the system table is performed by a single atomic memory operation.

* * * * *